(12) United States Patent
Shen et al.

(10) Patent No.: US 9,354,675 B1
(45) Date of Patent: May 31, 2016

(54) SERVER

(71) Applicants: INVENTEC (PUDONG) TECHNOLOGY CORPORATION, Shanghai (CN); INVENTEC CORPORATION, Taipei (TW)

(72) Inventors: Yu-Long Shen, Shanghai (CN); Ji-Peng Xu, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 8 days.

(21) Appl. No.: 14/609,587

(22) Filed: Jan. 30, 2015

(30) Foreign Application Priority Data

Nov. 10, 2014 (CN) .......................... 2014 1 0627516

(51) Int. Cl.
*G06F 1/18* (2006.01)
*G06F 11/20* (2006.01)

(52) U.S. Cl.
CPC ................ *G06F 1/184* (2013.01); *G06F 1/185* (2013.01); *G06F 11/2005* (2013.01); *G06F 11/2089* (2013.01)

(58) Field of Classification Search
CPC ..... G06F 1/184; G06F 11/2005; G06F 1/185; G06F 11/2089
USPC .................. 361/736, 679.01, 679.02, 679.31, 361/679.32, 679.33, 679.37–679.39, 361/724–727, 796–797
See application file for complete search history.

(56) References Cited

U.S. PATENT DOCUMENTS

| | | | | |
|---|---|---|---|---|
| 5,682,291 A * | 10/1997 | Jeffries | .................... | G06F 1/184 312/223.2 |
| 6,297,955 B1 * | 10/2001 | Frank, Jr. | .................. | G06F 1/18 361/679.41 |
| 6,377,447 B1 * | 4/2002 | Boe | ......................... | G06F 1/187 312/223.1 |
| 6,456,501 B1 * | 9/2002 | Rubenstein | .......... | G11B 33/128 211/41.17 |
| 6,574,100 B1 * | 6/2003 | Anderson | ............... | G06F 1/181 165/80.3 |
| 6,980,429 B2 * | 12/2005 | Ericks n | .................. | G06F 1/184 248/224.8 |
| 7,031,152 B1 * | 4/2006 | Tsai | ........................ | G06F 1/184 312/223.2 |

(Continued)

FOREIGN PATENT DOCUMENTS

TW 200708962 1/2007
TW 201044161 12/2010

(Continued)

*Primary Examiner* — Jinhee Lee
*Assistant Examiner* — Abhishek Rathod
(74) *Attorney, Agent, or Firm* — Kirton McConkie; Evan R. Witt

(57) ABSTRACT

A server comprises two mainboards, disposed on a base plate. The mainboards comprise a plurality of expander cards and an electrical module. The electrical module is provided with at least one first storage device. Each mainboard further comprises a daughter card disposed between the base plate and the electrical module. The expander card or the daughter card is served as a system-tray of the electrical module by the at least one first storage device of the electrical module, so as to manage a disk array for a plurality of second storage devices of the server. This ensures that when the storage device of the mainboard is malfunctioned, it doesn't need to turn off the server for repairing. Under a condition of not affect normal function of the server, more electrical elements are provided to a limited space so as to increase or upgrade the function of the server.

9 Claims, 14 Drawing Sheets

(56) References Cited

U.S. PATENT DOCUMENTS

| | | | | |
|---|---|---|---|---|
| 7,036,783 B2* | 5/2006 | Chen | G11B 33/128 | 248/222.11 |
| 7,362,565 B2* | 4/2008 | Imblum | G06F 1/184 | 361/679.33 |
| 7,755,887 B2* | 7/2010 | Chen | G06F 1/187 | 312/223.2 |
| 8,300,398 B2* | 10/2012 | Zhang | G06F 1/187 | 312/223.2 |
| 8,711,569 B2* | 4/2014 | Yi | H05K 7/1487 | 361/730 |
| 2002/0122296 A1* | 9/2002 | Stone | G06F 1/184 | 361/679.48 |
| 2007/0127225 A1* | 6/2007 | Slaton | G06F 1/185 | 361/807 |
| 2008/0253076 A1* | 10/2008 | Chen | G06F 1/186 | 361/679.31 |
| 2009/0059509 A1* | 3/2009 | Peng | G11B 33/128 | 361/679.33 |
| 2009/0251867 A1* | 10/2009 | Sharma | H04Q 1/08 | 361/737 |
| 2010/0027213 A1* | 2/2010 | Wu | G06F 1/184 | 361/679.39 |
| 2010/0118483 A1* | 5/2010 | Kurokawa | G06F 1/187 | 361/679.33 |
| 2010/0259884 A1* | 10/2010 | Wang | G06F 1/185 | 361/679.33 |
| 2010/0265645 A1* | 10/2010 | Wang | G06F 1/183 | 361/679.4 |
| 2010/0271766 A1* | 10/2010 | Lin | H05K 7/1487 | 361/679.02 |
| 2011/0043994 A1* | 2/2011 | Cheng | G06F 1/187 | 361/679.33 |
| 2011/0051342 A1* | 3/2011 | Crippen | G06F 1/185 | 361/679.4 |
| 2011/0090633 A1* | 4/2011 | Rabinovitz | G06F 1/184 | 361/679.31 |
| 2011/0191514 A1* | 8/2011 | Wu | G06F 1/26 | 710/301 |
| 2012/0050976 A1* | 3/2012 | Chen | G06F 1/16 | 361/679.32 |
| 2013/0135813 A1* | 5/2013 | Jimenez, III | G06F 1/185 | 361/679.32 |
| 2014/0040549 A1 | 2/2014 | DeKoning et al. | | |
| 2014/0085806 A1* | 3/2014 | Song | G06F 1/183 | 361/679.37 |

FOREIGN PATENT DOCUMENTS

| | | |
|---|---|---|
| TW | M456068 | 6/2013 |
| TW | 201418967 | 5/2014 |

* cited by examiner

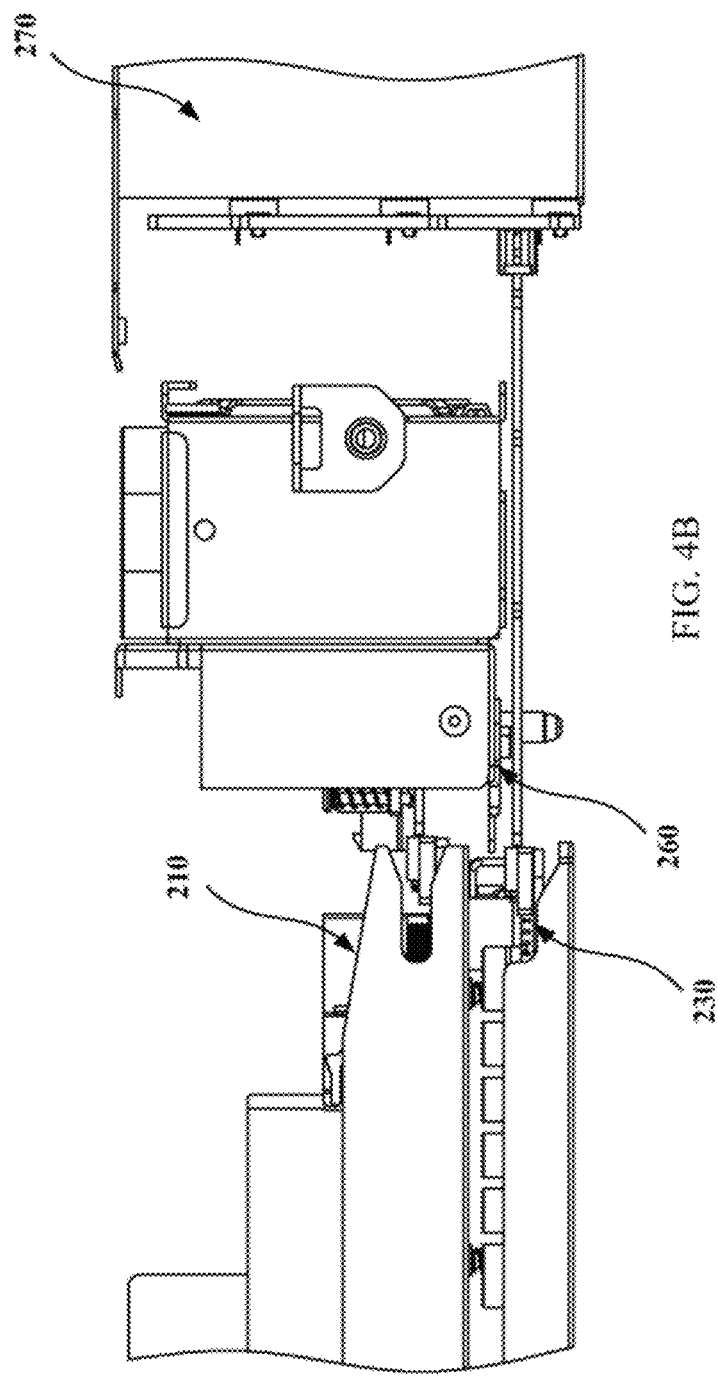

SERVER

FIELD OF THE INVENTION

The present invention relates to a field of server techniques, and particularly to an expander structure design of a server.

BACKGROUND OF THE INVENTION

Recently, with the popularization of the digital living environment and the rise and development of platforms, such as internet, mobile network, radio and television network, smart television, the total demand, management, and transmission of many kinds of information have increased explosively. Therefore, the server required for storage, processing, and other functions has also increased to support the ever increasing demand.

For example, a conventional server may comprise a chassis, a storage module, a connection module, and a mainboard. The chassis comprises a base chassis. The storage module is disposed on the base chassis and provided with a storage unit. The connection module is disposed on the base chassis and connected with the storage module. The mainboard is connected with the connection module in a pluggable manner. Please refer to FIG. 1, which depicts a schematic diagram of a mainboard of a conventional server. The mainboard 100 is disposed on a base plate 101, and the mainboard 100 is provided with at least one central processing unit (not shown on Fig.), a connector (not shown on Fig.), and at least one electrical module 110. The mainboard is coupled to the connection module via the connector for transmitting signals. The electrical module may be a storage device, such as a solid state hard disk or a general hard disk. In a configuration of the mainboard, the electrical module is provided with at least one storage device, such as two hard disks 120 which are superposed on each other, and is 2.5 inches. One of the two hard disks 120 is served as an OS disk, and the other hard disk is used for storing backup data, and they are mutually redundant. The two hard disks 120 support a hot-pluggable function. Since the two hard disks 120 support the hot-pluggable function and they are mutually redundant, if one of the hard disks is malfunctioned, the other hard disk can immediately take over its work, it doesn't need to turn off the server for repairing, and doesn't affect normal function of the mainboard, so as to ensure the stability and the reliability of the server.

In above-mentioned configuration, the mainboard may be further provided with an expander card 130, such as a lower profile card which is a PCIe (Peripheral Component Interconnect Express) card having a particular specification and has advantages of occupying a smaller space and convenient assembly. Since the expander card is inserted in, the function of the server can be increased or upgraded, thereby satisfying the market requirements. However, the space of the mainboard of the above-mentioned conventional server is limited. The structure of the mainboard of the server needs to be changed if it needs to support further expander cards, controlled cards, or other electrical elements, so that the server enables to expand more functions.

SUMMARY OF THE INVENTION

An object of the present invention is to provide a server which ensures that when the storage device (such as hard disk) of the mainboard is malfunctioned, the other storage device can take over its work, it doesn't need to turn off the server for repairing. Under a condition of not affect normal function of the server, more expander cards, controlled cards, or other electrical elements are provided to a limited space so as to increase or upgrade the function of the server, thereby satisfying the market requirements.

In order to solve the above-mentioned problems, the present invention provides a server comprising two mainboards disposed on a base plate, the two mainboards comprising a plurality of expander cards and an electrical module, where the electrical module is provided with at least one first storage device; each mainboard further comprises a daughter card disposed between the base plate and the electrical module; and the expander card or the daughter card is served as a system-tray of the electrical module by the at least one first storage device of the electrical module, so as to manage a disk array for a plurality of second storage devices of the server.

As an alternative technical solution, the server further comprises two expander boards, a connection module, and a storage module, where the storage module is provided with the plurality of second storage devices, the two mainboards and the two expander boards are respectively superposed on a chassis of the server, and are independently plugged in or released from the connection module, thereby connecting with the storage module via the connection module.

As an alternative technical solution, when at least one of the two mainboards is functioning normally and at least one of the two expander boards is functioning normally, the normally functioned mainboard reads from or writes data to the plurality of second storage devices by the normally functioned expander board.

As an alternative technical solution, any one of the mainboards and/or any one of the expander boards can be replaced without affecting a normal functioning of the server when the two mainboards are functioning normally and the two expander boards are functioning normally.

As an alternative technical solution, the mainboard further comprises a holder provided with at least one power supply module, the at least one power supply module is electrically connected with the expander card.

As an alternative technical solution, the electrical module further comprises a tray and a bracket, the tray comprises a plurality of elastic sheets on two sides thereof; the elastic sheet and a side wall of the tray are arranged at an angle, and the elastic sheet is provided with a positioning pin and a guiding section at an end thereof far from the side wall of the tray; the positioning pin is directed inward; the elastic sheet is transformed from an open status to a close status when the first storage device is disposed on the tray and inserted to the bracket, so that the positioning pin is inserted in a positioning hole of the first storage device, and fixed on the bracket; the guiding section smoothly passes through and the elastic sheet is transformed from the close status to the open status when the first storage device is disposed on the tray and pulled away from the bracket, so that the positioning pin is separated from the positioning hole of the first storage device thereby releasing from the bracket.

As an alternative technical solution, the tray further comprises a backplane and the bracket further comprises a circuit board, the backplane is electrically connected with the circuit board when the first storage device is inserted in the backplane and they are accompanied with the tray to insert in the bracket; the backplane is electrically disconnected from the circuit board when the first storage device is inserted in the backplane and they are accompanied with the tray to pull away from the bracket.

As an alternative technical solution, the tray further comprises a LED light disposed on an inner side of a front end of the tray and coupled with the backplane for displaying a status of the first storage device.

As an alternative technical solution, the tray further comprises a rotatable handle, when the tray inserted in the bracket, an open at a near end of the rotatable handle acts on a side of the bracket, the tray is fixed on the bracket by a thumb screw at a far end of the rotatable handle.

As an alternative technical solution, the server further comprises a power module disposed between the two mainboards or on a side of any one of the mainboards.

In summary, the server of the present invention server can ensure that when the storage device (such as hard disk) of the mainboard is malfunctioned, the other storage device can take over its work, it doesn't need to turn off the server for repairing. Under a condition of not affect normal function of the server, more expander cards, controlled cards, or other electrical elements are provided to a limited space so as to increase or upgrade the function of the server. Furthermore, the first mainboard and the second mainboard of the present invention are mutually redundant, and first expander board and the second expander board of the present invention are mutually redundant, any one of the mainboards and/or any one of the expander boards can be replaced without affecting a normal functioning of the server when the two mainboards are functioning normally and the two expander boards are functioning normally. If one of the mainboards or the expander boards is malfunctioned, the other mainboard or expander board can immediately take over its work, it doesn't need to turn off the server for repairing. Therefore, it doesn't need to turn off the server for replacing and it doesn't affect the stability and the reliability of the server, thereby increasing the work efficiency of clients and decreasing the cost for operating and repairing. Furthermore, the electrical module of the first mainboard and the second mainboard enables to replace the hard disk without using tools, i.e. the hard disk doesn't need a screw for assembling and disassembling.

BRIEF DESCRIPTION OF THE DRAWINGS

FIG. 4B depicts a partial enlarged schematic diagram of FIG. 4A.

DETAILED DESCRIPTION OF THE INVENTION

Figure 1:
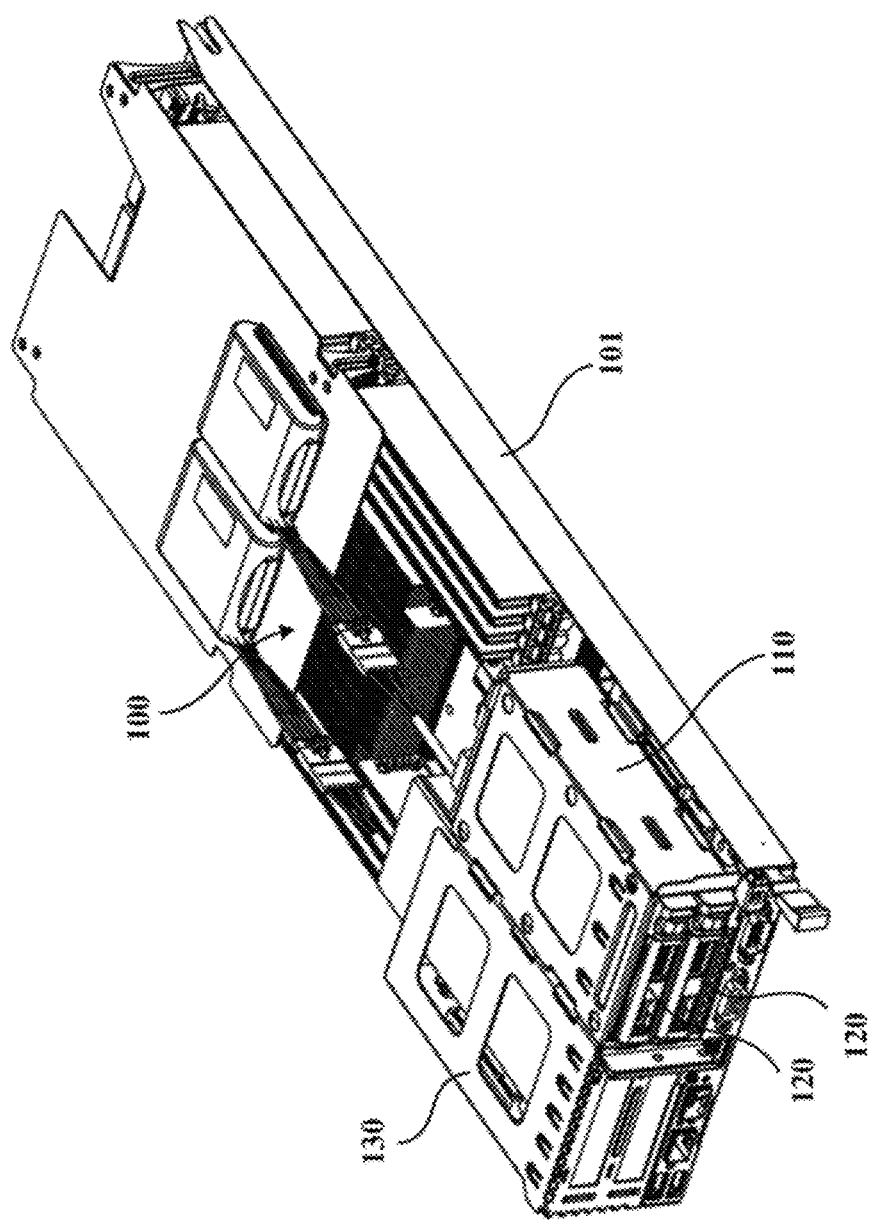
FIG. 1 depicts a structural schematic diagram of a mainboard of a conventional server.

A server according to an embodiment of the present invention will be introduced in detail by referring to those figures.

The structure of a server of the present invention is described in the following paragraphs. Please refer to FIG. 2 to FIG. 10, which show structural schematic diagrams of a server 200 according to an embodiment of the present invention.

Please refer to FIG. 2 and FIG. 3A to FIG. 3D, according to an embodiment of the present invention, the rack-mounted server 200 comprises a first expander module 290, a second expander module 292, a chassis 250, a first expander board 230, a second expander board 240, a connection module 260 (referring to FIG. 4A and FIG. 4B), a storage module 270, and a power module 280.

Figure 2:
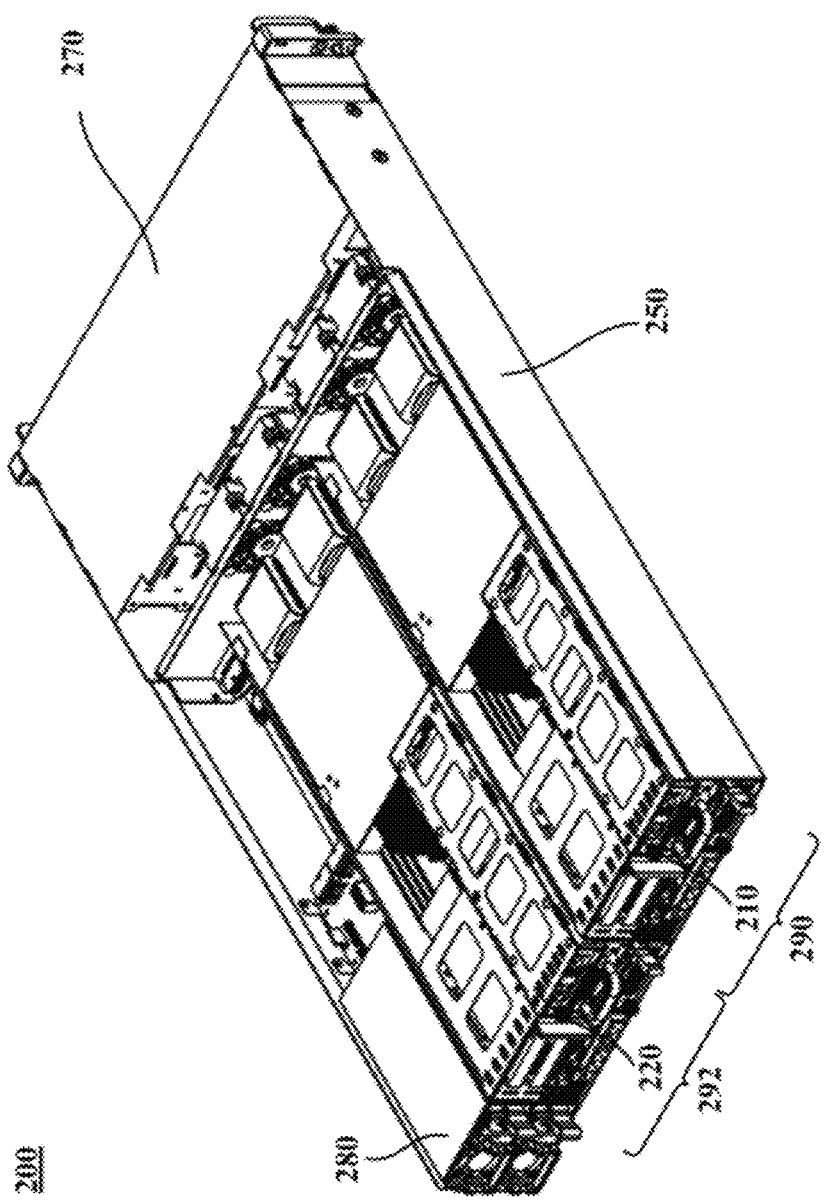
FIG. 2 depicts a structural schematic diagram of a server according to an embodiment of the present invention.
Figure 3A:
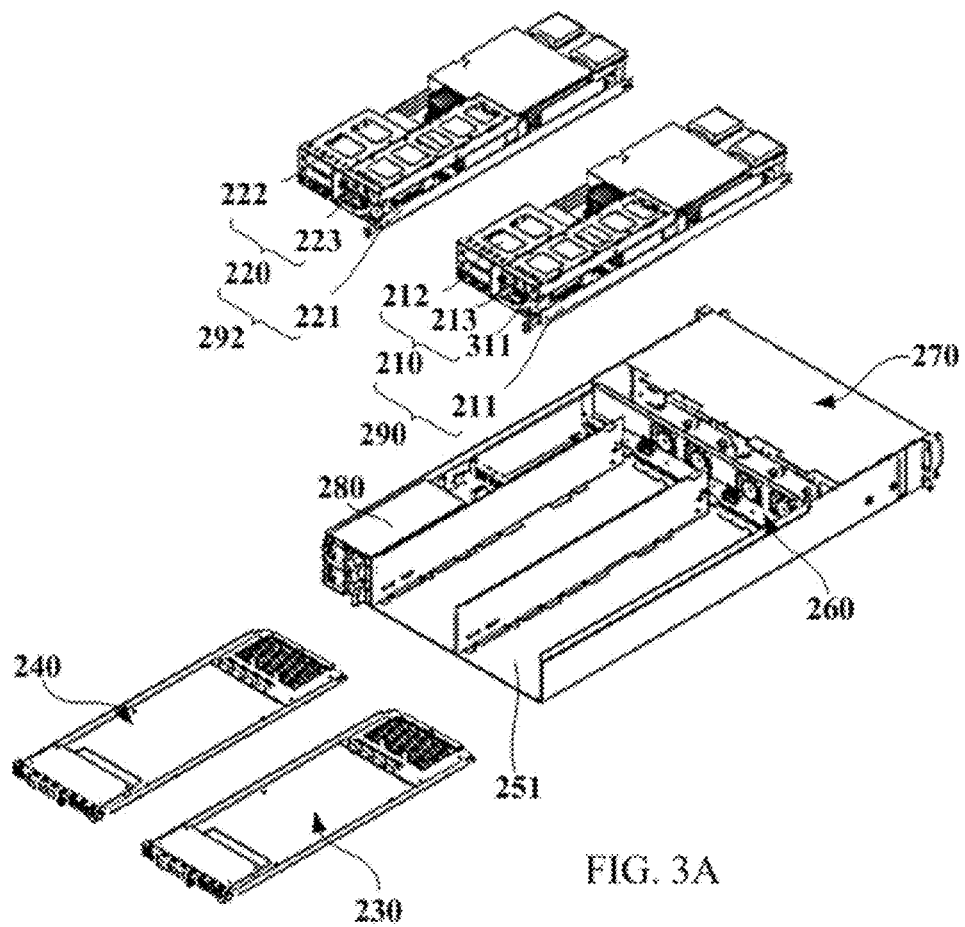
FIG. 3A depicts a position schematic diagram of a first mainboard, a second mainboard, a first expander board, and a second expander board according to an embodiment of the present invention.
Figure 3B:
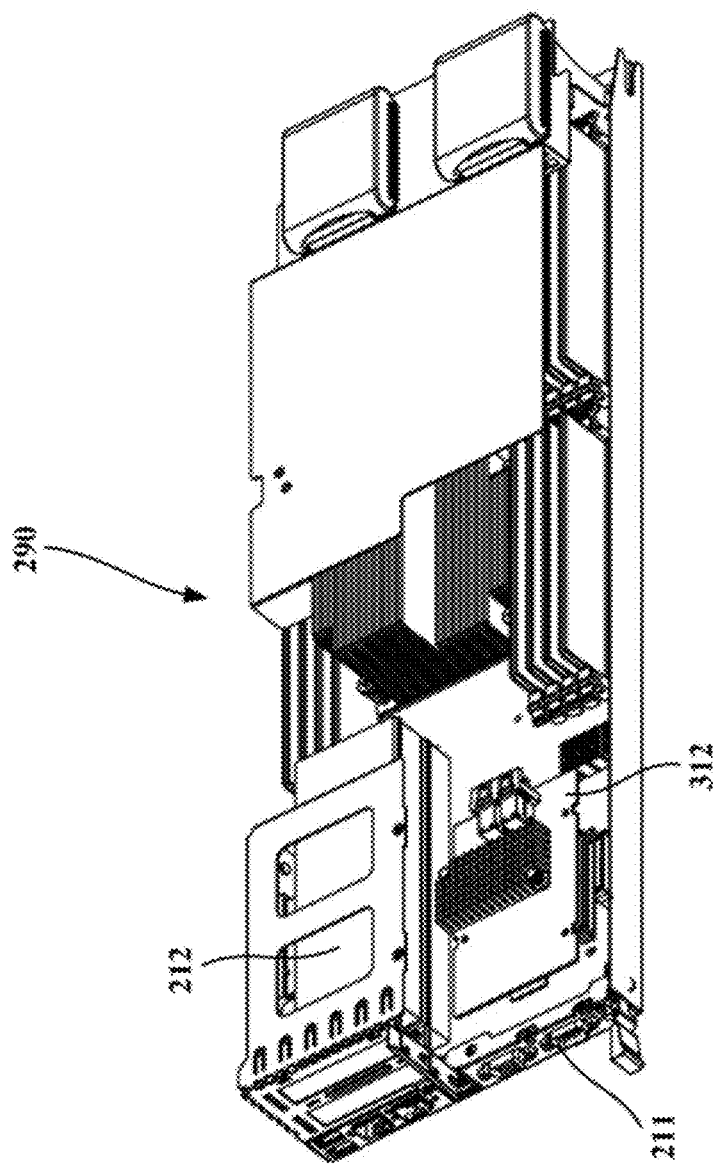
FIG. 3B depicts a partial structural schematic diagram of the first mainboard according to an embodiment of the present invention.

Please refer to FIG. 2 and FIG. 3A, the first expander module 290 comprises a first base plate 211 and a first mainboard 210 disposed on the first base plate 211. Similarly, the second expander module 292 comprises a second base plate 221 and a second mainboard 220 disposed on the second base plate 221. The first mainboard 210 is provided with a plurality of first expander cards 212 (for example, in this embodiment, there are two first expander cards) and a first electrical module 213. Similarly, the second mainboard 220 is provided with a plurality of second expander cards 222 (for example, in this embodiment, there are two second expander cards) and a second electrical module 223. In addition, each mainboard 210 and 220 further has at least one central processing unit (not shown) and a connector (not shown). Each mainboard 210 and 220 is coupled to the connection module 260 (referring to FIG. 4A and FIG. 4B) via the connector for transmitting signals.

Figure 3C:
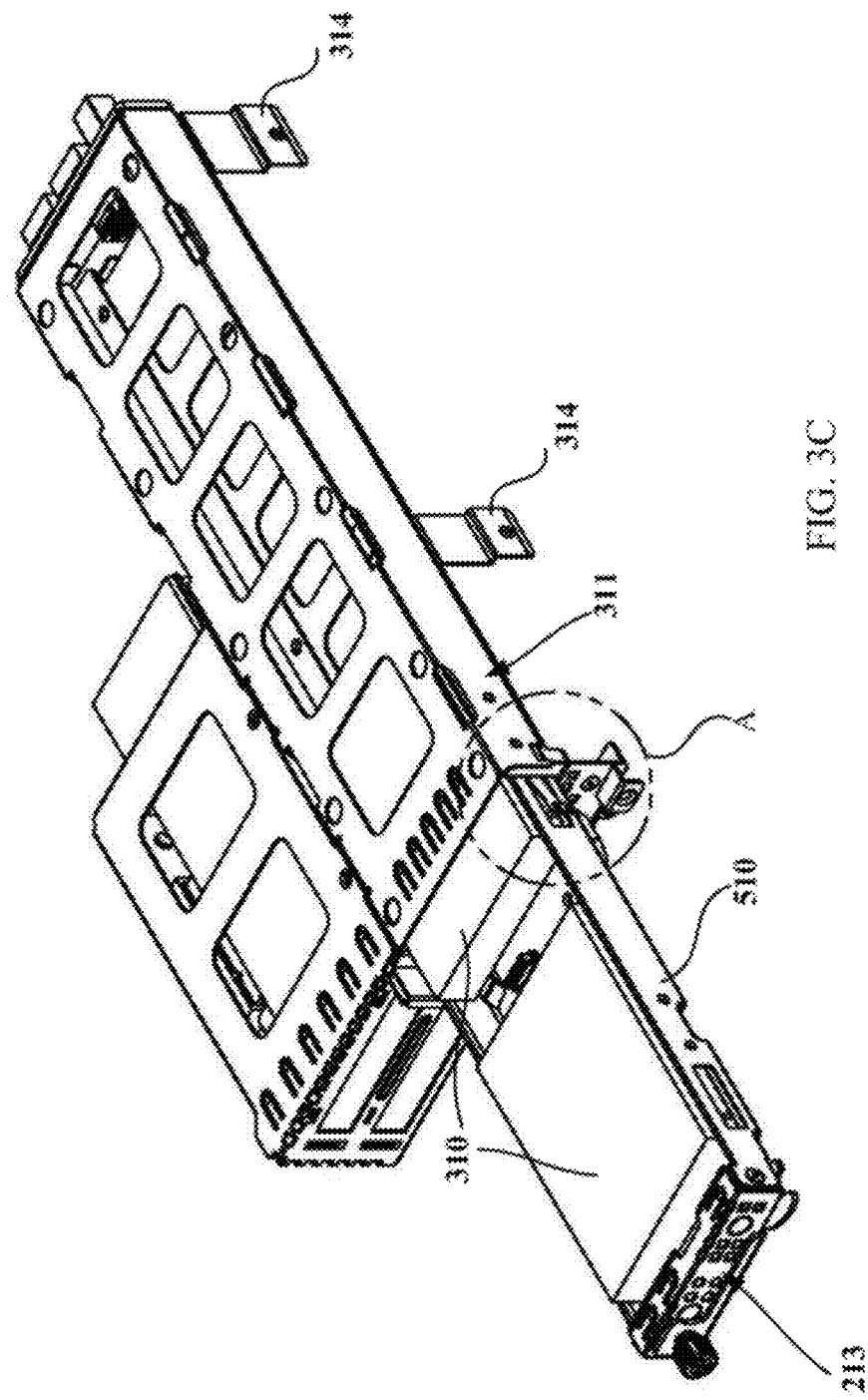
FIG. 3C depicts a structural schematic diagram of the first electrical module and the first expander card according to an embodiment of the present invention.

Please refer to FIG. 2 and FIG. 3C, the first electrical module 213 is provided with at least one first storage device which is regarded as a first hard disk 310 in this embodiment, and the following description use first hard disk 310 as example. The second electrical module 223 is provided with at least one first storage device which is regarded as a second hard disk (not shown) in this embodiment, and the following description use second hard disk as example. The at least one first hard disk 310 and the at least one second hard disk may be solid state hard disks or general hard disks, but not limited to. Please refer to FIG. 2 and FIG. 3A, the first electrical module 213 comprises a first bracket 311 and a first tray 510. Similarly, the second electrical module 223 comprises a second bracket (not shown) and a second tray. In this embodiment, the first electrical module 213 is disposed higher than the first base plate 211 by using the first bracket 311, and the second bracket is disposed higher than the second base plate 221 by using the second bracket. The first hard disk 310 and the corresponding second hard disk are arranged along a horizontal direction and they are mutually redundant by a configuration that the first base plate 211 and the second base plate 221 are arranged in line abreast. One of the hard disk is served as an OS disk of the mainboard, and the other hard disk is used for storing backup data. If one of the first hard disk 310 or any one of the hard disk in the second hard disk is malfunctioned, the other hard disk can take over its work, so as to ensure a normal operation of the server 200.

Please refer to FIG. 2 and FIG. 3A, the chassis 250 is configured to form an accommodation space therein. The accommodation space is divided into a plurality of sub accommodation spaces by a plurality of horizontal and/or vertical shims, thereby respectively accommodating the first expander module 290, the second expander module 292, the first expander board 230, the second expander board 240, the connection module 260, the storage module 270, and the power module 280 in the plurality of sub accommodation spaces of the chassis 250.

Figure 3D:
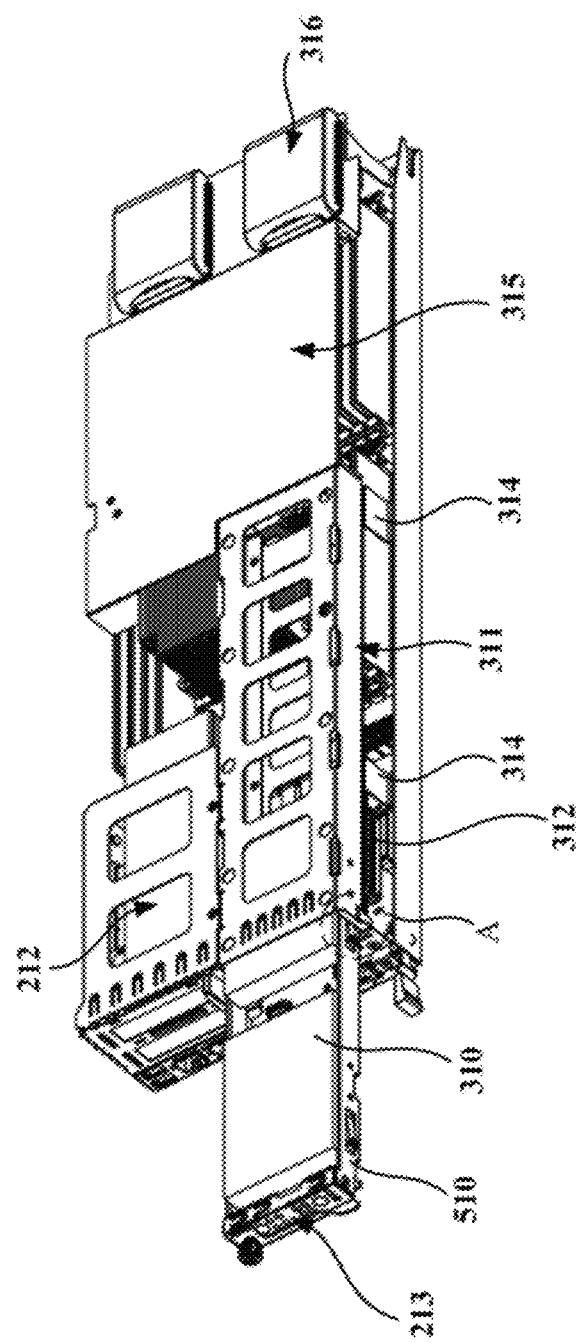
FIG. 3D depicts a structural schematic diagram of the first mainboard according to an embodiment of the present invention, where elements of the first mainboard are assembled.
Figure 4A:
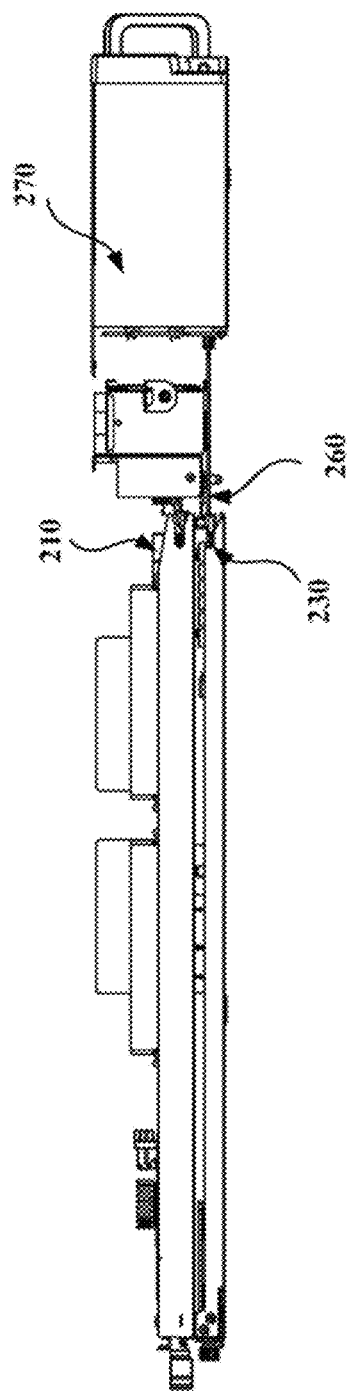
FIG. 4A depicts a connection schematic diagram of a connection module according to an embodiment of the present invention.

Please further refer to FIG. 3A and FIG. 3D, in the first expander module 290, the first mainboard 210 is disposed on the first base plate 211. A first daughter card 312 is disposed between the first electrical module 213 located above the first mainboard 210 and the first base plate 211. As shown on FIG. 3B, the first daughter card 312 is superposed on and parallel to the first electrical module 213 by a separation of the first base plate 211. The first daughter card 312 is used for serving as a system-tray by the first hard disk 310 of the first electrical module 213, so as to manage a disk array for a plurality of second storage devices (not shown) of the storage module 270 of the server 200. Similarly, in the second expander module 292, the second mainboard 220 is disposed on the second base plate 221. A second daughter card (not shown) is disposed between the second electrical module 223 and the second base plate 221, where the structure and the application of the second daughter card are same as the first daughter card 312. The second daughter card is superposed on and parallel to the second electrical module 223 by a separation of the second base plate 221. The second daughter card is used for serving as the system-tray by the second hard disk of the second electrical module 223, so as to manage the disk array for the plurality of second storage devices of the storage module 270 of the server 200. It should be noted that the first expander card 212 may be served as the system-tray by the first hard disk 310 of the first electrical module 213, so as to manage the disk array for the plurality of second storage devices of the storage module 270 of the server 200. Similarly, the second expander card 222 may be served as the system-tray by the second hard disk of the second electrical module 223, so as to manage the disk array for the plurality of second storage devices of the storage module 270 of the server 200.

The structures of the first electrical module 213 of the first mainboard 210 and the second electrical module 223 of the second mainboard 220 will be introduced in detail below. Please refer to FIG. 3A and FIG. 3D, in this embodiment, the first electrical module 213 is provided with at least two first hard disks 310, a first tray 510, and a first bracket 311. The second electrical module 223 is provided with at least two second hard disks, a second tray, and a second bracket. The first tray 510 is used for accommodating the at least two first hard disks 310, so that the at least two first hard disks 310 are arranged along two abreast parallel lines, and the at least two first hard disks 310 are serial coupled to each other (the "serial coupled" will be described further subsequently). The second tray us used for accommodating the al least two second hard disks, so that the at least two second hard disks are arranged along two abreast parallel lines, and the at least two second hard disks are parallel coupled to each other. In this embodiment, the two first hard disks 310 of the first electrical module 213 and the two second hard disks of the second electrical module 223 may be 2.5 inches. Furthermore, the at least two first hard disks 310 and the at least two second hard disk are mutually redundant. As shown on FIG. 3A, the first hard disk 310 of the first electrical module 213 and the first second hard disk of the second electrical module 223 are mutually redundant, and the second first hard disk 310 of the first electrical module 213 and the second hard disk of the second electrical module 223 are mutually redundant, and so on. Each the first hard disk 310 of the first electrical module 213 and the corresponding second hard disk of the second electrical module 223 are mutually redundant, but not limited to the present invention. If any one of the hard disk in the first hard disks 310 of the first electrical module 213 and the second hard disks of the second electrical module 223 is malfunctioned, the other hard disk of the corresponding electrical module will automatically take over its work, so as to ensure the normal operation of the server 200. In the prior art, as shown on FIG. 1, in order to replace any one of the mal-functional hard disk of the two hard disks without affecting a normal functioning of the server 200, the two hard disks need to be arranged in superposed relation and are mutually redundant, also the two hard disks need to support a hot-pluggable function. The structure of the first mainboard 210 is same as the second mainboard 220 of the present invention, and they are mutually redundant. Furthermore, the first electrical module 213 of the first mainboard 210 and the second electrical module 223 of the second mainboard 220 are mutually redundant. The normal operation of the server 200 will not be affected while replacing any one of electrical modules. Therefore, the first hard disk 310 of the first electrical module 213 and the second hard disk of the second electrical module 223 can un-support a singular hot-pluggable function, so that the first hard disk 310 of the first electrical module 213 and the second hard disk of the second electrical module 223 can be arranged in a one-layer configuration instead of a two-layers configuration in the prior art. Hence, in comparison with the prior art, the present invention utilizes the one-layer configuration instead of the original two-layers configuration, so that the space of the first mainboard 210 and the second mainboard 220 being respectively occupied by the first electrical module 213 and the second electrical module 223 is decreased. Therefore, additional expander cards or daughter cards are provided to the saved space so as to increase or upgrade the function of the server 200.

For above, since the first hard disk 310 of the first electrical module 213 and the second hard disk of the second electrical module 223 are arranged in the one-layer configuration, so that additional expander cards or daughter cards can be provided to the saved space. Therefore, in this embodiment, the first bracket 311 carries the first tray 510 of the first electrical module 213 therein, and the plurality of supports 314 of the first bracket 311 support the first electrical module 213 above the first base plate 211, so that a space is formed between the first electrical module 213 and the first base plate 211 for accommodating a first daughter card 312, such as a RAID card (redundant array of independent disks card), control card, and so on. The first daughter card 312 and the first electrical module 213 are arranged in parallel. The first hard disk 310 of the first electrical module 213 is served as the system-tray, so as to manage the disk array for the plurality of second storage devices of the storage module 270 of the server 200. The first daughter card 312 and the first electrical module 213 are superposed on the first mainboard 210. Similarly, the second bracket carries the second tray of the second electrical module 223 therein, and the plurality of supports of the second bracket support the second electrical module 223 above the second base plate 221, so that a space is formed between the second electrical module 223 and the second base plate 221 for accommodating a second daughter card, such as a RAID card, control card, and so on. The second daughter card and the second electrical module 223 are arranged in parallel. The second hard disk of the second electrical module 223 is served as the system-tray, so as to manage the disk array for the plurality of second storage devices of the storage module 270 of the server 200. The second daughter card and the second electrical module 223 are superposed on the second mainboard 220. Therefore, it satisfies that an expander requirement from clients by newly adding the first daughter card 312 and the second daughter card.

In addition, in this embodiment, the first mainboard 210 is not only provided with a plurality of first expander cards 212 and a first electrical module 213, but also provided with a first holder 315 and at least one first processing unit (not shown) for executing an operation system. The first holder 315 is provided with at least two power supply modules 316 electrically connected with the first expander card 212 via cables. The first holder 315 is further provided with at least two first solid state hard disk control cards (not shown on Figs., which can be called first NGFF, Next Generation Form Factor, which is a new-type interface) cards for serving as an operation system or a solid state hard disk for storing backup data. The first holder 315 is further served as a wind-guiding cover. Similarly, in this embodiment, the second mainboard 220 is not only provided with a plurality of second expander card 222 and a second electrical module 223, but also provided with a second holder (not shown on Figs., the structure is same as the first holder 315) and at least one second processing unit (not shown on Figs.) for executing an operation system. The second holder is provided with at least two power supply modules 316 electrically connected with the second expander card 222 via cables. The second holder is further provided with at least two second solid state hard disk control cards (which can be called second NGFF cards) for serving as an operation system or a solid state hard disk for storing backup data. The second holder is further served as a wind-guiding cover.

Please refer to FIG. 2, FIG. 3A to FIG. 3D, and FIG. 4A to FIG. 4B, the first expander board 230 is disposed between the first base plate 211 of the first expander module 290 and the base chassis 251 of the chassis 250, and the first expander board 230 is parallel to the bottom of the first base plate 211 while assembling. The first base plate 211 is disposed in the chassis 250, so the first expander board 230, the first daughter card 312, and the first electrical module 213 are superposed on each other. The second expander board 240 is disposed between the second base plate 221 of the second expander module 292 and the base chassis 251 of the chassis 250, and the second expander board 240 is parallel to the bottom of the second base plate 221. The second base plate 221 is disposed in the chassis 250, so the second expander board 240, the second daughter card, and the second electrical module 223 are superposed on each other. Therefore, the first expander board 230 is located below the first mainboard 210 and located on a lower layer of the chassis 250, and the second expander board 240 is located below the second mainboard 220 and located on a lower layer of the chassis 250.

Furthermore, in this embodiment, the storage module 270 is provided with a plurality of second storage devices (not shown on Figs.). The first mainboard 210, the second mainboard 220, the first expander board 230, and the second expander board 240 are connected with the connection module 260 in a pluggable manner, thereby connecting with the storage module 270 via the connection module 260. In other words, in this embodiment or the other embodiment, the first mainboard 210, the first expander board 230, the second mainboard 220, and the second expander board 240 are accommodated in an end of the chassis 250. The storage module 270 is located on an opposite end of the chassis 250. The connection module 260 and a fan module (not shown on Figs.) are located between both sides of the chassis 250. Therefore, the connection module 260 is electrically connected with the elements of the server 200, so that the elements can transmit signals or data to each other (referring to FIG. 4A to FIG. 4B).

Please refer to FIG. 2 to FIG. 3D, in this embodiment, the first base plate 211 and the second base plate 221 are respectively disposed on the two sub accommodation spaces of the chassis 250, the first mainboard 210 can be located above the first expander board 230, and they are separated from each other without interference. The second mainboard 220 is located above the second expander board 240, and they are separated from each other without interference, thereby ensuring that the positions of the first mainboard 210, the second mainboard 220, the first expander board 230, and the second expander board 240 inserting in the corresponding connection module 260 are correct. In addition, the thickness of the first mainboard 210 and the second mainboard 220 are about 1.5 U, and the thickness of the first expander board 230 and the second expander board 240 are about 1.5 U. The different thickness of the mainboard and the expander board can prevent mismating. The first mainboard 210, the second mainboard 220, the first expander board 230, and the second expander board 240 are independently disposed on the chassis 250, and the first mainboard 210, the second mainboard 220, the first expander board 230, and the second expander board 240 support a hot-pluggable function. Therefore, in comparison with the conventional mainboard and expander card, which cannot be separated for repairing and the assembly process is complex, the present invention provides a good maintenance condition via the first mainboard 210, the second mainboard 220, the first expander board 230, and the second expander board 240.

When at least one expander boards of the first expander board 230 and the second expander board 240 is functioning normally and at least one mainboards of the first mainboard 210 and the second mainboard 220 is functioning normally, the normally functioned first mainboard 210 or the second mainboard 220 reads from or writes data to the second storage device of the storage module 270 by the normally functioned first expander board 230 or the second expander board 240.

The first mainboard 210, the second mainboard 220, the first expander board 230, and the second expander board 240 are independently disposed on the chassis 250. When the first mainboard 210, the second mainboard 220, the first expander board 230, and the second expander board 240 are functioning normally, the normally functioned first mainboard 210 and the corresponding first base plate 211 can be replaced, the second mainboard 220 and the corresponding second base plate 221 can be replaced, or the normally functioned first expander board 230 and the second expander board 240 can be replaced without affecting a normal functioning of the server 200.

In addition, please refer to FIG. 3A, the structure of the first expander board 230 is same as the second expander board 240, and they are mutually redundant. The first expander board 230 and the second expander board 240 are both provided with a connector (not shown on Figs.), so that the other electrical elements (such as storage groups or similar parts which support a JBOD function, but not limited to the present invention) can plug in or connect with the connector, so as to expanding the function of the server 200.

In this embodiment, the power module 280 is disposed on a side of the second mainboard 220 and the second expander board 240. The opposite side of the second mainboard 220 and the second expander board 240 is adjacent to the first mainboard 210 and the first expander board 230. However, the relative positions of the second mainboard 220, the second expander board 240, the first mainboard 210, the first expander board 230, and the power module 280 are not limited to the present invention. In the other embodiment, the power module 280 may be disposed between the first expander board 230 and the second expander board 240. That is, the power module 280 is disposed between the first mainboard 210 and the second mainboard 220. Also, the power module 280 may be disposed on the side of the first mainboard 210 and the first expander board 230. In summary, the relative positions of first mainboard 210, the first expander board 230, the second mainboard 220, the second expander board 240, and the power module 280 can be adjusted according to actual needs. The power module 280 is a redundant design, and supports a hot-pluggable function.

The first electrical module 213 is introduced in detail below. Please refer to FIG. 3C and FIG. 3D, since the structure of the first electrical module 213 is same as the second electrical module 223, the below description uses only the first electrical module 213 as an example, and the structure of the second electrical module 223 is omitted here.

Please refer to FIG. 5 to FIG. 10, the first electrical module 213 further comprises a pair of first elastic sheets 513 which are disposed on the both sides of the first tray 510. In this embodiment, the two first hard disks 310 are respectively fixed on the first tray 510 by two first elastic sheets 513 which are disposed on the both sides of the first tray 510. In the other embodiment, if the first tray 510 is provided with a plurality of first hard disks 310 therein, the first tray 510 needs to be provided with a plurality of pair of first elastic sheets 513 on the side wall 511. Furthermore, the first elastic sheets 513 on the two side walls 511 of the first tray 510 are arranged in a same level, so as to ensure the heights of each first elastic sheet 513 fixing to the first hard disk 310 are same.

Figure 5:
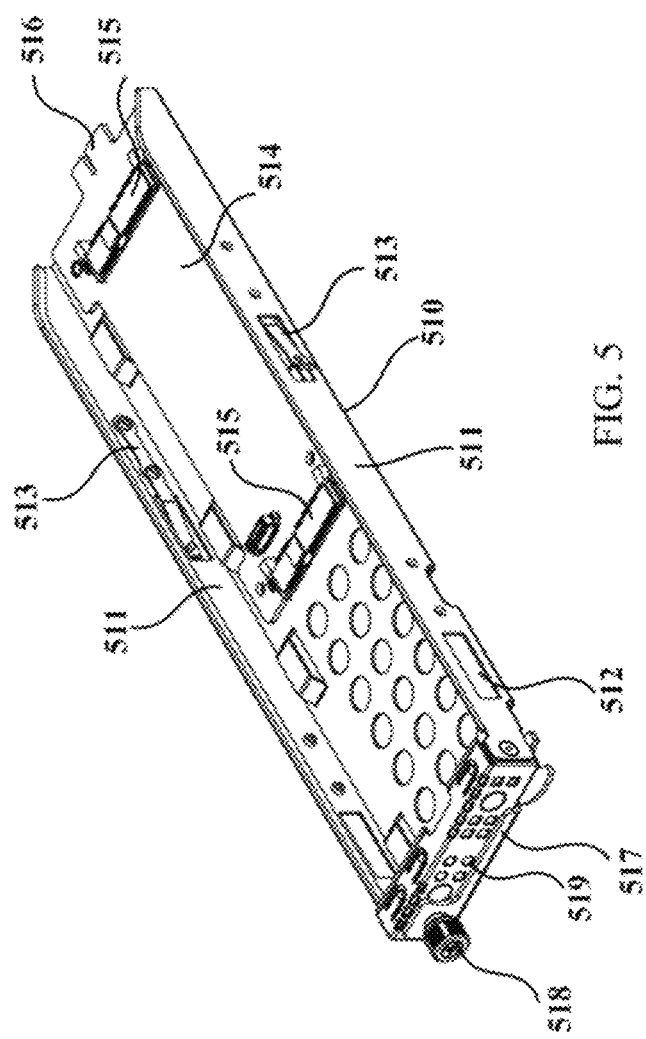
FIG. 5 depicts a structural schematic diagram of a first tray according to an embodiment of the present invention.
Figure 6:
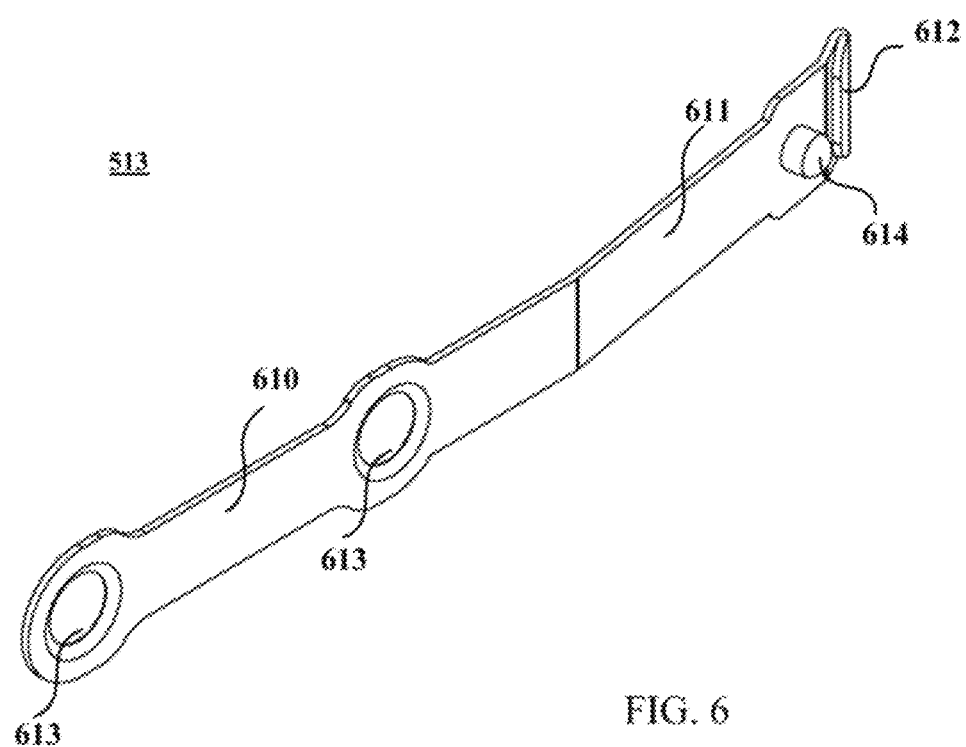
FIG. 6 depicts a structural schematic diagram of a first elastic sheet according to an embodiment of the present invention.

Please refer to FIG. 5 and FIG. 6, each first elastic sheet 513 comprises a first fixed section 610 and a first elastic arm 611. The first fixed section 610 is used for fixing the first elastic sheet 513 on an inner surface of the side wall 511 with respective to the first tray 510. The first fixed section 610 is provided with at least two fixing holes 613. The first elastic sheets 513 are fixed on the inner surface of the side wall 511 of the first tray 510 by using the fixing holes 613 and connection members (not shown on Figs.). The connection members may be screw members or rivet members, and so on. In addition, first through slots 512 (referring to FIG. 9) are formed on the side wall 511, which are located on the position with respective to the first elastic sheets 513. Each first through slots 512 extends between the first elastic arm 611 and the first fixed section 610, so that the first elastic arm 611 can freely pass through the first through slot 512, and extends beyond the side wall 511 (i.e. extending toward a direction away from the first hard disk 310).

Since the first elastic sheets 513 are made from metal plate, the first elastic arm 611 has a good elastic deformation coefficient, but the material of the first elastic arm 611 is not limited thereof. The first elastic arm 611 extends from the first fixed section 610 toward a direction far from the first hard disk 310, and the first elastic arm 611 and the first fixed section 610 are arranged at an angle (such as a bending angle). That is, the first elastic arm 611 of the elastic sheet 513 and the side wall of the tray 510 are arranged at an angle. When the first tray 510 of the first electrical module 213 is in an original status and does not be squeezed (i.e. before inserting in the first bracket 311), the first elastic arm 611 of the first elastic sheet 513 is in an outward open status. When the first tray 510 is inserted in the first bracket 311 along a first direction, the first elastic arm 611 touches the side wall of the first bracket 311, and then it gradually elastically deforms to form a close status by the squeezing force. When the first tray 510 is inserted in the side wall along a second direction, it is in the close status. When the first tray 510 is pulled away from the first bracket 311 along the second direction, the first elastic arm 611 is transformed from the close status to form the open status, where it is separate from the side wall of the first bracket 311, and then the first elastic arm 611 releases its elastic potential energy until the first elastic arm 611 is separated from the side wall of the first bracket 311.

The first elastic arm 611 is provided with a first positioning pin 614 which outward extends and is generally perpendicular to the first elastic arm 611, and the positioning pin 614 is directed inward toward the first tray 510. When the first tray 510 is inserted in the first bracket 311 along the first direction (such as a right direction) and the first elastic arm 611 is inserted in the side wall of the first bracket 311 to form the close status, the first positioning pin 614 located on the first elastic sheet 513 is engaged to a positioning hole (not shown on Figs.) of the first hard disk 310 by a first through slot 512 (referring to FIG. 9) which is disposed on the side wall 511 of the first tray 510, so as to fix the first hard disk 310. When the first tray 510 is pulled away from the first bracket 311 along the second direction (such as left direction), the first positioning pin 614 located on the first elastic sheet 513 is separated from the positioning hole of the first hard disk 310, thereby releasing the first hard disk 310. In the other embodiment, when the first fixed section 610 of the first elastic sheet 513 is disposed on an outside of the side wall 511, the size of a through hole of the first through slot 512 is arranged to be able to allow the first positioning pin 614 to pass through the first through slot 512 and to insert in the positioning hole of the first hard disk 310. It should be noted that the first positioning pin 614 of the first elastic sheet 513 just need to be able to insert in the positioning hole which is located on a side of the first hard disk 310, so as to fix the first hard disk 310 on the first tray 510. There is no limitation on the high of the first hard disk 310, the first elastic sheet 513 thus has the advantage of generality.

Figure 9:
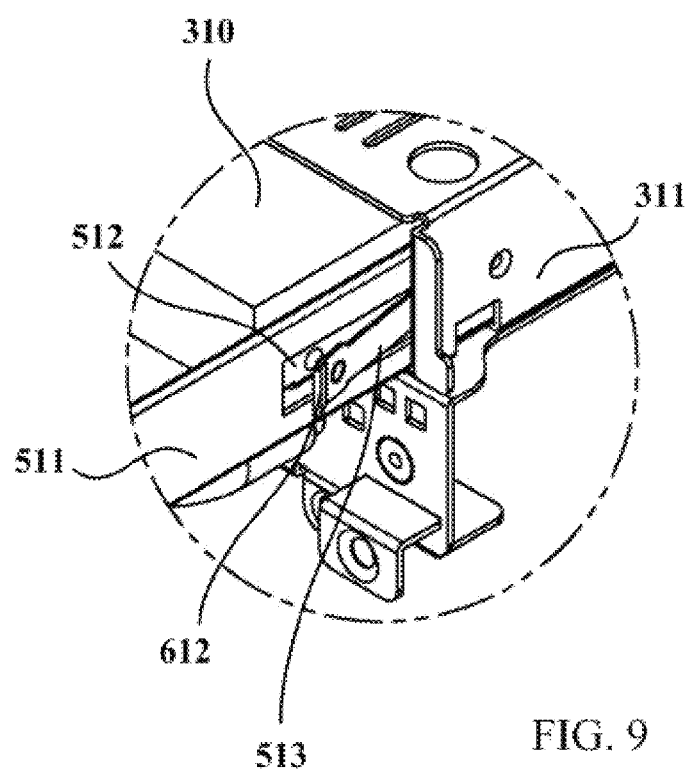
FIG. 9 depicts a partial enlarged schematic diagram of an A point shown on FIG. 3C.

Please refer to FIG. 6, FIG. 3D, and FIG. 9, the first elastic arm 611 further comprises a first guiding section 612. The first guiding section 612 is arc-shaped which is disposed on a top end of the first elastic arm 611. When the first tray 510 is pulled away from the first bracket 311 along the second direction (such as a left direction), the guiding section 612 smoothly passes through, so that the first tray 510 is smoothly separated from the side wall (not shown on Figs.) of the first bracket 311, so as to ensure that the first tray 510 will not receive a large resistance generated be the side wall of the first bracket 311, so that the first tray 510 can be flexible and easily pulled away from the first bracket 311.

Furthermore, the first tray 510 further comprises at least one backplane (in this embodiment, the backplane is a first hard disk backplane 514, the below description uses the first hard disk backplane 514 as an example). The first bracket 311 further comprises a circuit board (not shown on Figs.). The first hard disk backplane 514 has at least one first connector 515 and second connector 516. Please refer to FIG. 5, when the at least one first hard disk 310 is disposed on the accommodation space of the first tray 510, the first hard disk 310 is coupled to the first connector 515 of the first hard disk backplane 514. In the other embodiment, when a plurality of first hard disks 310 are disposed on the accommodation space of the first tray 510, each first hard disk 310 is correspondingly coupled to each first connector 515 of the first hard disk backplane 514, so that the plurality of first hard disks 310 are in a series connection. Thus, the first hard disks 310 which are disposed on the first tray 510 have expansibility by a plurality of first connectors 515 which are disposed on the first hard disk backplane 514. When the first hard disk 310 is inserted in the first hard disk backplane 514, and they are accompanied with the first tray 510 to insert in the first bracket 311, the second connector 516 of the first hard disk backplane 514 is electrically connected with a connector (not shown on Figs.) of the circuit board of the first bracket 311. When the first hard disk 310 is inserted in the first hard disk backplane 514, and they are accompanied with the first tray 510 to pull away from the first bracket 311, the second connector 516 of the first hard disk backplane 514 is electrically disconnected from the circuit board of the first bracket 311.

Please refer to FIG. 5, alternately, the first tray 510 further comprises a first rotatable handle 517. An axis (not shown on Figs.) of the first rotatable handle 517 is disposed on a front end of the first tray 510 and a corner of the side wall 511, and is fixedly disposed on a bottom surface of the base plate of the first tray 510. Furthermore, an open at a near end of the first rotatable handle 517 acts on a side of the first bracket 510. When the first tray 510 is inserted in the first bracket 311, the first rotatable handle 517 is rotated from a first position (such as an extension direction that an arm of the first rotatable handle 517 extends generally parallel to the side wall 511) to a second position (such as an extension direction that the arm of the first rotatable handle 517 extends generally parallel to the front end of the first tray 510). The first rotatable handle 517 is used for fixing the first tray 510 on the first bracket 311. When the first tray 510 is pulled away from the first bracket 311, the first rotatable handle 517 is rotated from the second position (such as an extension direction that the arm of the first rotatable handle 517 extends generally parallel to the front end of the first tray 510) to the first position (such as an extension direction that the arm of the first rotatable handle 517 extends generally parallel to the side wall 511). The first rotatable handle 517 is used for releasing the first tray 510 from the first bracket 311. Furthermore, a corresponding side of the axis of the first rotatable handle 517 has a first thumb screw 518. When the first rotatable handle 517 is in the second position, the first rotatable handle 517 is fixed on the front end of the first tray 510 by the first thumb screw 518.

Alternately, the first tray 510 further comprises a first LED light 519 which is disposed on the front end of the first tray 510 and coupled to the first hard disk backplane 514 for displaying a status of the first hard disk 310.

Figure 7:
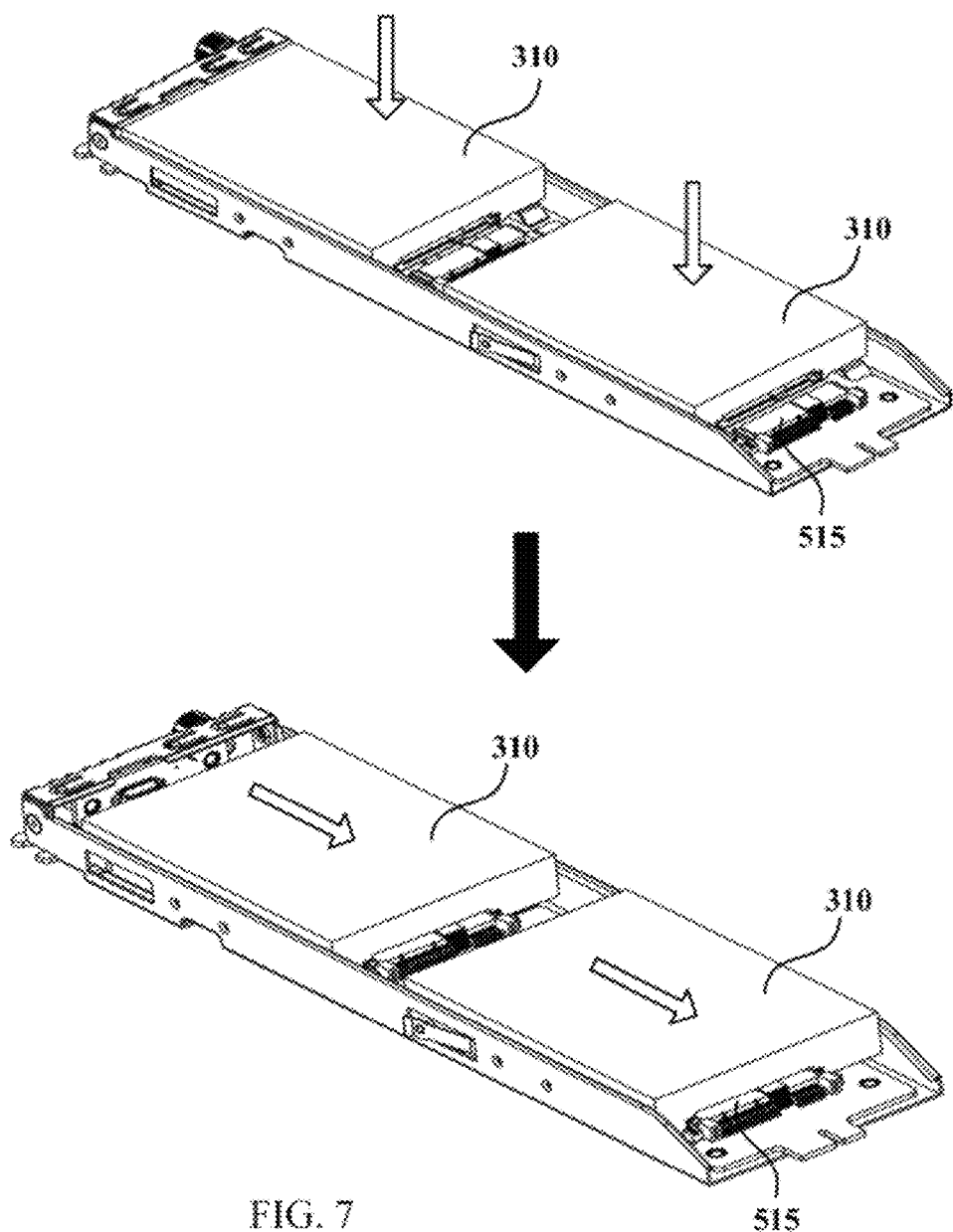
FIG. 7 depicts a structural schematic diagram of a first hard disk being assembling on the first tray according to an embodiment of the present invention.
Figure 8:
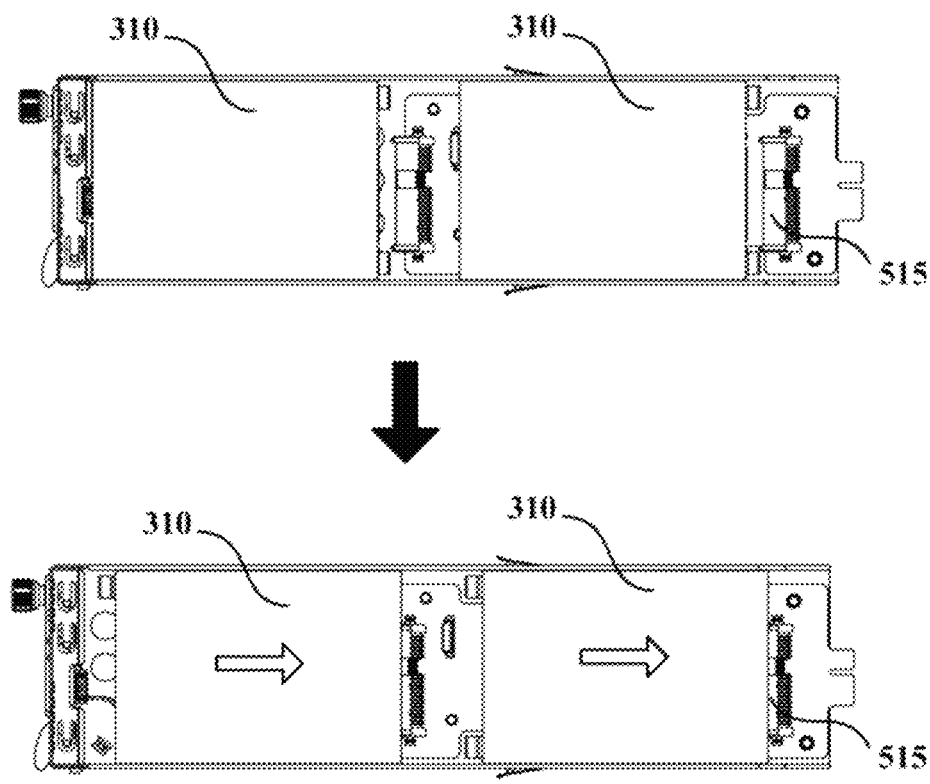
FIG. 8 depicts a structural schematic diagram of FIG. 7, where the first hard disk is connected with the first connector.

Please refer to FIG. 7, a process of assembling the first hard disk 310 with the first tray 510 is further described. Firstly, the first hard disk 310 is perpendicularly disposed on the first tray 510 (referring an arrow which is perpendicularly directed downward shown on FIG. 7). Next, each first hard disk 310 is pushed to move toward a direction, such as a left direction arrow shown on FIG. 8), so that an end of each first hard disk 310 is connected with the first connector 515. As shown on FIG. 8, the operation of assembling the first hard disk 310 within the first tray 510 is convenient and fast.

Figure 10:
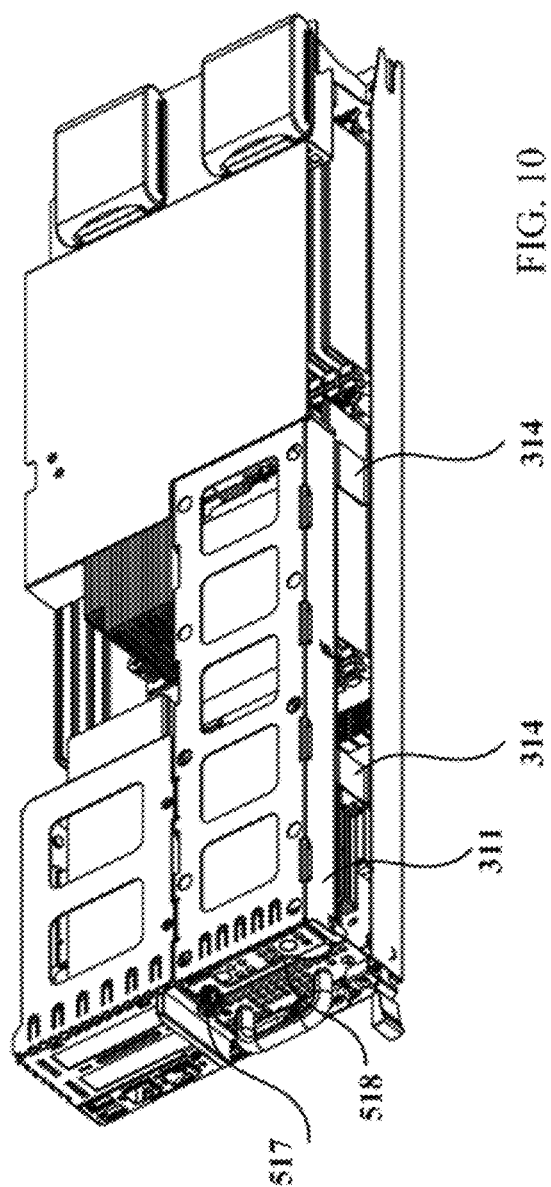
FIG. 10 depicts a structural schematic diagram of a first bracket inserted in the first tray according to an embodiment of the present invention.

Please refer to FIG. 3D, FIG. 9, and FIG. 10, after assembling the first hard disk 310 to the first tray 510, the first tray 510 needs to be inserted in the first bracket 311. The side wall of the first bracket 311 has a restraint function, so the first elastic arm 611 of the first elastic sheet 513 is squeezed by a force toward the first hard disk 310, and then it gradually elastically deforms from an open status to a close status until the first elastic arm 611 of the first elastic sheet 513 is inserted in the side wall of the first bracket 311. The first positioning pin 614 of the first elastic arm 611 is automatically engaged to the positioning hole of the first hard disk 310 via the first through slot 512, thereby fixing the first hard disk 310 on the first tray 510. In this process, there is no need to provide the other engagement structure. The first elastic sheet 513 is closed and in the close status by an effect of the side wall of the first bracket 311. Each first positioning pin 614 of the first elastic sheet 513 is engaged to the corresponding positioning hole of the first hard disk 310, thereby fixing the corresponding first hard disk 310. Finally, the first rotatable handle 517 is rotated from the first position to the second position, and the first thumb screw 518 is screwed, so as to fix first rotatable handle 517 on the front end of the first tray 510. The first rotatable handle 517 is used for fixed the first tray 510 on the first bracket 311 (as shown on FIG. 10).

The above described is an assembly situation that the first hard disk 310 and the first tray 510 are inserted in the first bracket 311. The disassembly situation that the first hard disk 310 and the first tray 510 are separated from the first bracket 311 is similar as the assembly situation, and it is implemented by reversing the above steps. To be specific, firstly, the first thumb screw 518 is unscrewed and the first rotatable handle 517 is rotated. The first rotatable handle 517 is rotated from the second position to the first position. The first rotatable handle 517 is used for unfixing the first tray 510 from the first bracket 311. Next, the first tray 510 is pulled away from the first bracket 311 along the second direction. The first tray 510 is smoothly separated from the side wall of the first bracket 311 by the first guiding section 612 of the first elastic sheet 513. The first elastic arm 611 of the first elastic sheet 513 is transformed from the close status to form the open status, where it is separate from the side wall of the first bracket 311, and then the first elastic arm 611 releases its elastic potential energy until the first elastic arm 611 of the first elastic sheet 513 is separated from the side wall of the first bracket 311. Thus, the second connector 516 of the first hard disk backplane 514 is pulled away from and decoupled to the connector of the circuit board of the first bracket 311. The first positioning pin 614 of the first elastic sheet 513 is separated from positioning hole of the first hard disk 310, thereby releasing the first hard disk 310. After the first tray 510 is totally pulled away from the first bracket 311, i.e. the first elastic arm 611 of the first elastic sheet 513 is in the open status, the first hard disk 310 may be pulled away from the first connector 515 of the first hard disk backplane 514 to decouple with the first connector 515, thereby replacing the first hard disk 310. The replacement process of the hard disk is easy and convenient without using tools.

The present invention provides the rack-mounted server 200 which ensures that when the hard disk of the mainboard is malfunctioned, the other hard disk can take over its work, it doesn't need to turn off the server for repairing. Under a condition of not affect normal function of the server, more expander cards, controlled cards, or other electrical elements are provided to a limited space so as to increase or upgrade the function of the server. Furthermore, the first mainboard 210 and the second mainboard 220 of the present invention are mutually redundant, and the first expander board 230 and the second expander board 240 are mutually redundant. Any one of the mainboards and/or any one of the expander boards can be replaced without affecting a normal functioning of the server when the two mainboards are functioning normally and the two expander boards are functioning normally. If one of the mainboards or the expander boards is malfunctioned, the other mainboard or expander board can immediately take over its work, it doesn't need to turn off the server for repairing. Therefore, it doesn't need to turn off the server for replacing and it doesn't affect the stability and the reliability of the server 200, thereby increasing the work efficiency of clients and decreasing the cost for operating and repairing. Furthermore, the first mainboard 210 and the second mainboard 220 enable to replace the hard disk without using tools, i.e. the hard disk doesn't need a screw for assembling and disassembling.

The above descriptions are merely preferable embodiments of the present invention. It should be noted that those of ordinary skill in the art can make improvements and modifications without departing from the principle of the present invention, and all of the improvements and modifications should be contained within the scope of the attached claims of the present invention.

What is claimed is:

1. A server, comprising two mainboards disposed on a base plate, the two mainboards comprising a plurality of expander cards and an electrical module,
    wherein the electrical module is provided with at least one first storage device;
    each mainboard further comprises a daughter card disposed between the base plate and the electrical module;
    the expander cards or the daughter card is served as a system-tray of the electrical module by the at least one first storage device of the electrical module, so as to manage a disk array for a plurality of second storage devices of the server; and
    two expander boards, a connection module, and a storage module, wherein the storage module is provided with the plurality of second storage devices, the two mainboards and the two expander boards are respectively superposed on a chassis of the server, and are independently plugged in or released from the connection module, thereby connecting with the storage module via the connection module.

2. The server according to claim 1, wherein when at least one of the two mainboards is functioning normally and at least one of the two expander boards is functioning normally, the normally functioned mainboard reads from or writes data to the plurality of second storage devices by the normally functioned expander board.

3. The server according to claim 1, wherein any one of the mainboards and/or any one of the expander boards can be replaced without affecting a normal functioning of the server when the two mainboards are functioning normally and the two expander boards are functioning normally.

4. The server according to claim 1, wherein the mainboard further comprises a holder provided with at least one power supply module, the at least one power supply module is electrically connected with the expander card.

5. The server according to claim 1, wherein the electrical module further comprises a tray and a bracket, the tray comprises a plurality of elastic sheets on two sides thereof; the elastic sheet and a side wall of the tray are arranged at an angle, and the elastic sheet is provided with a positioning pin and a guiding section at an end thereof far from the side wall of the tray; the positioning pin is directed inward; the elastic sheet is transformed from an open status to a close status when the first storage device is disposed on the tray and inserted to the bracket, so that the positioning pin is inserted in a positioning hole of the first storage device, and fixed on the bracket; the guiding section smoothly passes through and the elastic sheet is transformed from the close status to the open status when the first storage device is disposed on the tray and pulled away from the bracket, so that the positioning pin is separated from the positioning hole of the first storage device thereby releasing from the bracket.

6. The server according to claim 5, wherein the tray further comprises a backplane and the bracket further comprises a circuit board, the backplane is electrically connected with the circuit board when the first storage device is inserted in the backplane and they are accompanied with the tray to insert in the bracket; the backplane is electrically disconnected from the circuit board when the first storage device is inserted in the backplane and they are accompanied with the tray to pull away from the bracket.

7. The server according to claim 6, wherein the tray further comprises a LED light disposed on an inner side of a front end of the tray and coupled with the backplane for displaying a status of the first storage device.

8. The server according to claim 5, wherein the tray further comprises a rotatable handle, when the tray inserted in the bracket, an open at a near end of the rotatable handle acts on a side of the bracket, the tray is fixed on the bracket by a thumb screw at a far end of the rotatable handle.

9. The server according to claim 1, further comprising a power module disposed between the two mainboards or on a side of any one of the mainboards.

* * * * *